May 19, 1936.  R. WARREN  2,041,445
LOCKABLE FREEWHEEL TRANSMISSION MECHANISM
Filed Sept. 19, 1935    5 Sheets-Sheet 1

Inventor
Reginald Warren
By Dowell & Dowell
Attorneys

May 19, 1936.  R. WARREN  2,041,445
LOCKABLE FREEWHEEL TRANSMISSION MECHANISM
Filed Sept. 19, 1935  5 Sheets—Sheet 2

Inventor
Reginald Warren
By Dowell & Dowell
Attorneys

May 19, 1936.  R. WARREN  2,041,445
LOCKABLE FREEWHEEL TRANSMISSION MECHANISM
Filed Sept. 19, 1935   5 Sheets-Sheet 3
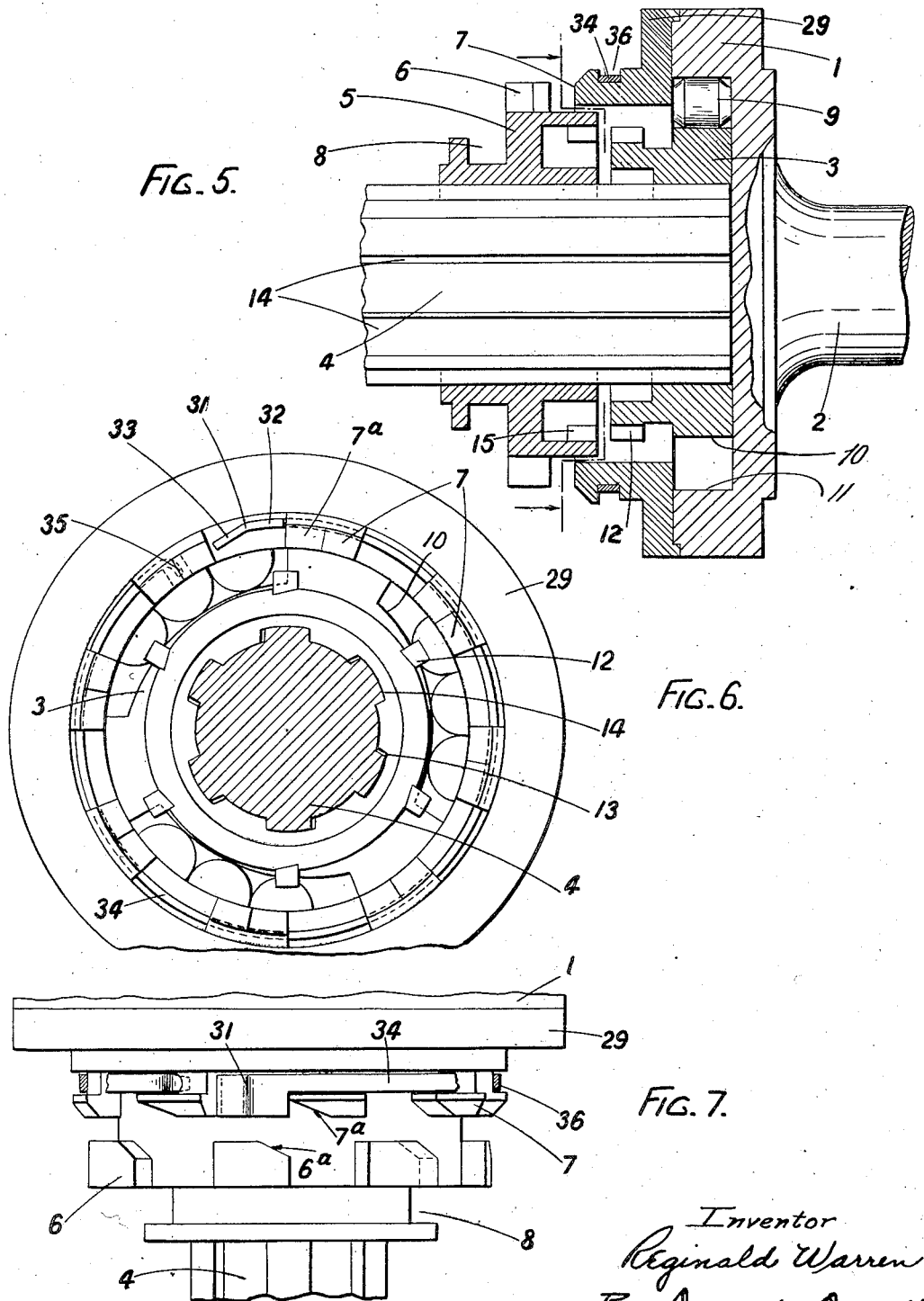

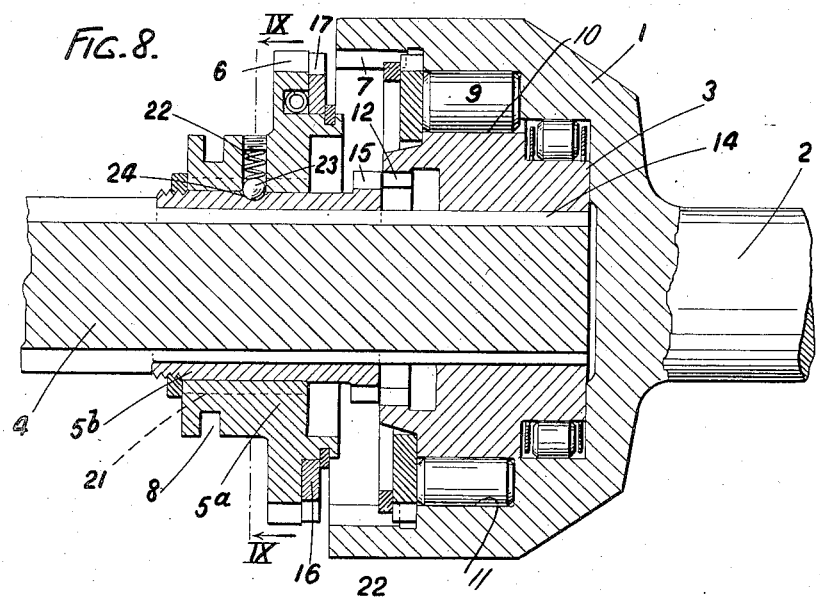
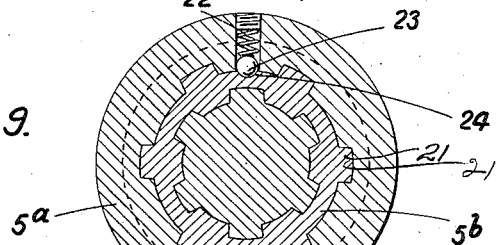
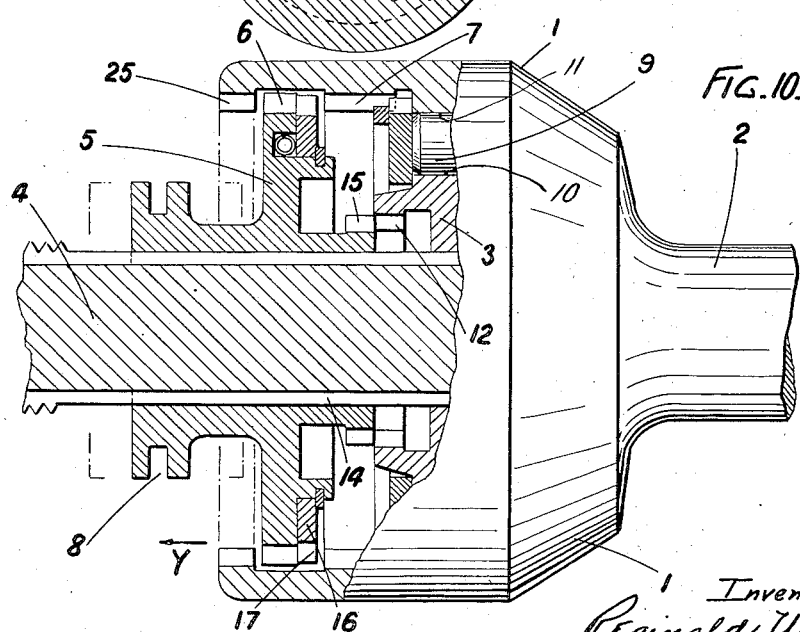

May 19, 1936.  R. WARREN  2,041,445
LOCKABLE FREEWHEEL TRANSMISSION MECHANISM
Filed Sept. 19, 1935   5 Sheets-Sheet 5

Inventor
Reginald Warren
By Dowell & Dowell
Attorneys

Patented May 19, 1936

2,041,445

UNITED STATES PATENT OFFICE 2,041,445

LOCKABLE FREEWHEEL TRANSMISSION MECHANISM

Reginald Warren, Reading, England, assignor to The Pulsometer Engineering Company Limited, Reading, Berks, England Application September 19, 1935, Serial No. 41,325
In Great Britain April 14, 1934

15 Claims. (Cl. 192—48)

The present invention relates to free-wheel transmission mechanism, with reference more particularly to the type in which a free wheel clutch is combined with a positive dog clutch, comprising dogs or teeth associated with the driving member of the free wheel and corresponding dogs or teeth associated with the driven member thereof, the interengagement of the two sets of dogs rendering the free wheel clutch inoperative and thus providing a fixed or so-called "solid" drive, which may be and generally is a reversible drive, as distinguished from the unidirectional rotation which the free wheel affords.

Free wheels of the kind referred to are commonly used in association with change-speed (and, sometimes, reverse) mechanism, especially on motor vehicles and the present invention is primarily directed to free wheel devices for such use, although it is not necessarily limited thereto.

In the operation of lockable free wheels, the actual locking operation cannot be effected satisfactorily when the driven member of the free wheel clutch is rotating appreciably faster than the driving member and, in order to avoid the risk of damage to the dogs or teeth of the locking mechanism as well as to other parts of the transmission, it is usual not to attempt to lock the free wheel except when the latter is in drive-transmitting condition.

One of the objects of the present invention is so to modify and improve the locking means in free wheel transmission mechanism of the kind referred to as to permit such locking means to be set for locking the free wheel clutch at any time, irrespective of whether the transmission is stationary or rotating and, in the latter case, irrespective of whether the driven member of the free wheel clutch is actually being driven or is over-running the driving member thereof.

For the attainment of this object the driving, or driven, member of the free wheel clutch is constituted to act also as a balking ring for the positive dog clutch and the corresponding driven, or driving, member of said free wheel clutch is constituted to act also as one element of said positive dog clutch, the second or opposing element of which is constituted, as is usual in lockable free wheels, by a locking plate which, however, is provided with additional teeth or dogs adapted to co-act with the balking ring member in such manner as to ensure that the driving and the driven members of the free wheel are brought to the same, or substantially the same, speed of rotation prior to actual engagement of the locking dogs. Preferably, the balking ring member and the locking plate member are arranged for relative axial movement and for limited relative angular movement, sufficient for balking purposes, on a common driving, or driven, shaft.

A further object of the invention is to provide a free-wheel transmission mechanism, lockable by means of a dog clutch, and including balking means for ensuring substantial synchronism between the driving and driven members of the free-wheel clutch at the time of locking, and means for overcoming or eliminating the balking action, or otherwise rendering it ineffective to prevent locking at times when the mechanism has come to rest with the parts in balking position. This object can be achieved in various ways, as by providing for forcible displacement of one or both of the balking elements relatively to the associated locking dogs, or by employing auxiliary locking dogs, the attempted engagement of which does not call the balking means into play at all.

In lockable free-wheel mechanism a condition sometimes arises in which, when an attempt is being made to lock the free wheel, the driving member thereof takes up the drive at an angular position relative to the driven member, such that the locking dogs have almost but not quite reached the required alignment for interpenetration and engagement. In these circumstances, strong application of driving torque, from the motor or other power source provided for driving the transmission, may, nevertheless, put such stress on the working parts as to force the locking dogs into engagement and permanent jamming of the device in the locked condition may then result, as free wheel clutches (and particularly those of the heavy-duty type intended for power operation) generally operate with a wedging action.

A further object of the invention is, therefore, to provide a free-wheel clutch lockable by means of a dog-clutch, wherein the free wheel must be relieved of torque before the locking dogs can actually engage, even though the driving and driven members of the free wheel may previously have been brought to a condition of synchronism. For the attainment of this object, it suffices, in some cases, to give the locking plate a slight angular play upon the shaft upon which it is mounted in common with one member of the free wheel, which member may, as aforesaid, include a synchronizing balking ring.

Jamming of the kind mentioned can also be avoided if at least one of the two sets of locking dogs of the positive dog clutch is associated with a balking device (which may take the form of a mask or of an intertooth obturating member), positioned to balk simple axially directed relative engaging movement of the dogs, but permitting interpenetration thereof by relative helical movement in the overrunning condition of the free wheel clutch and yielding under such movement to allow said dogs to engage.

In the accompanying drawings:

Fig. 1 is a longitudinal section, taken on the line I—I of Fig. 2, and

Fig. 2 a transverse section, taken on the line II—II of Fig. 1, looking to the left in the direction of the arrows, of a known type of free-wheel transmission mechanism, incorporating synchronizing balking means in accordance with this invention;

Fig. 5 is a view in axial section of lockable free-wheel mechanism incorporating anti-jamming means in the form of a radially yielding intertooth obturating element, applied to one of the two sets of locking dogs;

Fig. 6 is an end view of the free-wheel shown in Fig. 5, with the locking plate removed and the transmission shaft, carrying said locking plate and the free wheel inner member, shown in section;

Fig. 7 is a plan view of the mechanism of Figs. 5 and 6;

Fig. 8 is a view similar to Fig. 3, showing a similar mechanism with a modification which permits a locking of the free wheel, when required, notwithstanding balking action on the part of the synchronizing balking members;

Fig. 9 is a transverse section on line IX—IX of Fig. 8;

Fig. 10 is a view resembling Fig. 3, showing a construction permitting the free wheel to be locked, when required, without any of the balking means coming into play at all;

In the examples shown, the locking plate, as is usual in lockable free-wheel mechanisms of the kind referred to, is the axially slidable member of the dog clutch, the axially fixed member thereof being the outer free wheel member. When a synchronizing balking ring is present it is made integral with or mounted on the inner free wheel member.

Figure 1:
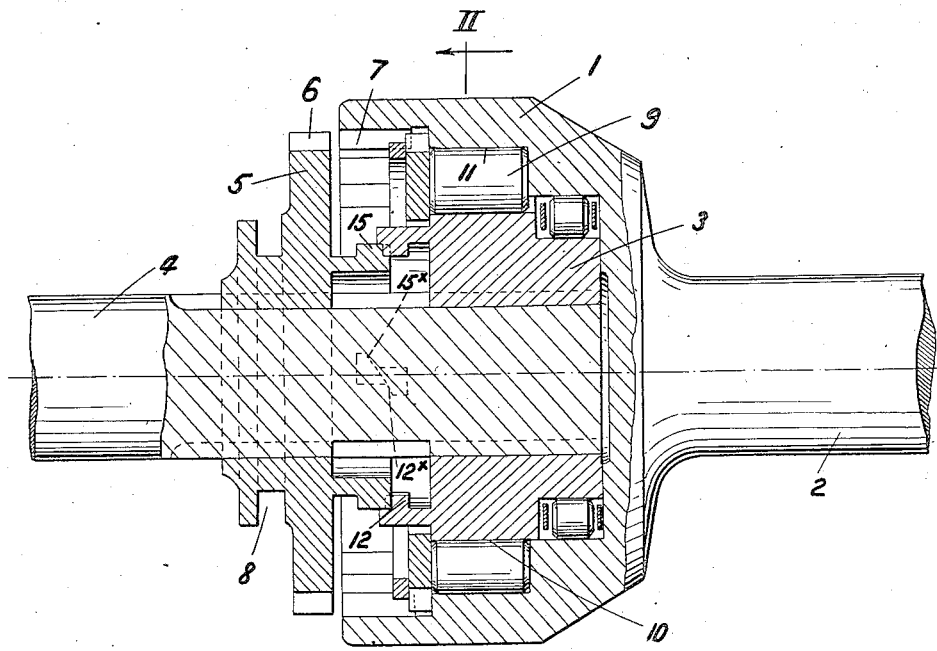
Figure 2:
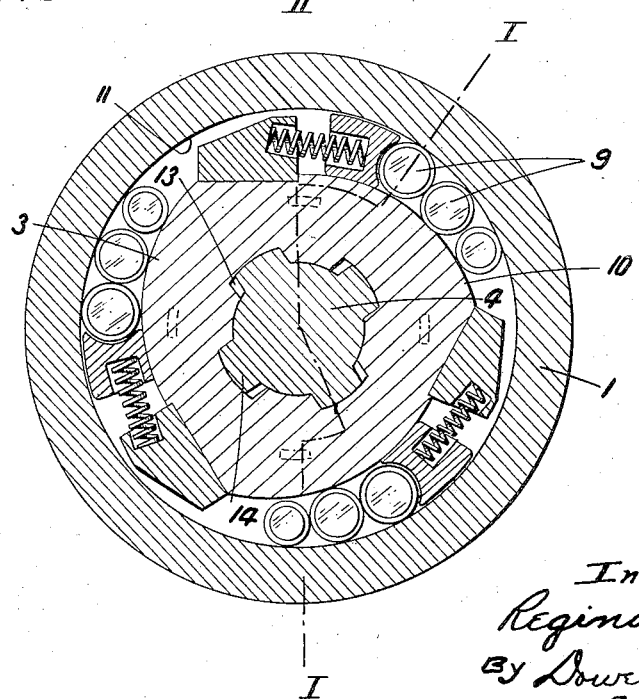

Referring first to Figs. 1 and 2, the free wheel comprises an outer cup-shaped member 1, here assumed to be the driven member, coupled to the driven or tail shaft 2 of the transmission and an inner member 3, here assumed to be the driving member, mounted upon the shaft 4 from which the drive is transmitted, and which, in a motor vehicle for instance, would be the main shaft of the gear box. The last named shaft has slidably splined thereon the locking plate 5, the periphery of which is provided with dogs 6 adapted for interengagement with corresponding dogs 7 on the inner rim of the aforesaid member 1. A shifting fork (not shown), acting within the shifting collar groove 8 in the locking member 5, serves for shifting the latter axially. The drive-transmitting members of the free-wheel mechanism may be those commonly used in heavy duty free wheels and are shown as spring-urged rollers 9 co-acting with cam-like surfaces 10 on the driving member 3 and with the interior track surface 11 of the driven member 1.

The synchronizing balking mechanism includes balking teeth or dogs 12 on the member 3 of the free wheel clutch, which member rides with a limited angular play 13 upon the splines 14 of the shaft 4, and teeth or dogs 15 provided on the locking plate 5 to co-act with said balking ring teeth 12 and to be balked by the latter when the driven member of the free wheel is overrunning. There is sufficient friction in the free wheel mechanism during free-wheeling to ensure that the driving and balking member 3 will be carried around on the splined driving shaft 4 (within the limits of its angular movement 13 thereupon) to the balking position and that it will be brought back to the non-balking position at the inception of overrun of the said driving shaft. However, in order to obviate any possibility of the balking members being accidentally jolted into the non-balking position before the driving parts of the transmission commence to take up the drive, the confronting end faces $12x$, $15x$ of the balking teeth 12 and 15, may be given a certain amount of bevel or inclination in their opposed vertical plane edges (as illustrated in dotted lines in Fig. 1, representing a view of such teeth as they might appear behind the plane of the section) so that, when the opposing balking teeth are yieldingly pressed together axially, there will be set up between the locking plate and the balking ring member a torsional reaction tending to maintain balking until the taking up of the drive forces these opposing inclined tooth faces to clear or override each other.

It is also preferred to so construct the device that when balking is taking place a small clearance (of say one thirty-second of an inch) exists between the confronting end faces of the main dogs (6 and 7), from which it follows that the balking teeth must actually clear or override each other before said main dogs can engage.

It may happen that, just when balking ceases and the locking plate begins to advance toward the locking position, the free wheel clutch mechanism, which depends for its functioning upon a wedging action, will take up the drive in a position such that the main dogs of the locking plate and free wheel driven member are not in exact alignment for positive engagement, the locking plate having advanced angularly just a little too far. However, when and while this condition exists the free wheel is able to transmit any driving torque up to the maximum and just as soon as the driving shaft is slowed down, even if the slowing is only slight and momentary, the main dogs will align and engage positively, the locking plate being yieldingly urged to such engagement by spring or equivalent means embodied in the locking control (not shown). The condition described may in fact be intentionally promoted, as will hereinafter appear, with a view to relieving the free wheel clutch of driving torque at the moment of locking and so preventing the mechanism from becoming jammed in the locked condition.

With any lockable free-wheel clutch of the kind referred to, jamming is liable to occur when locking the free wheel under heavy load, if the fit of the locking plate on the splines of the shaft which drives it is a very accurate one. To a great extent this danger of jamming can be avoided by giving the locking plate a very slight angular play on the splines of its driving shaft. A play of a few thousandths of an inch will suffice for this purpose.

Another expedient for preventing jamming consists in interposing, directly in the path of engagement of the free wheel locking dogs, a balking ring or mask which is mounted in or upon one of the two members constituting the aforesaid positive dog clutch, said balking ring being capable of rotary movement through a limited angle relatively to said dog clutch member and being biased angularly in relation thereto, so as to be normally in a balking position such that the opposing dog clutch member and said balking ring can engage at a time when the free wheel clutch is transmitting the drive, whereas mutual engagement of the two sets of locking dogs is permitted only when the free wheel clutch, by commencing to idle, unbiases the balking ring and so unmasks the corresponding locking dogs.

Figure 3:
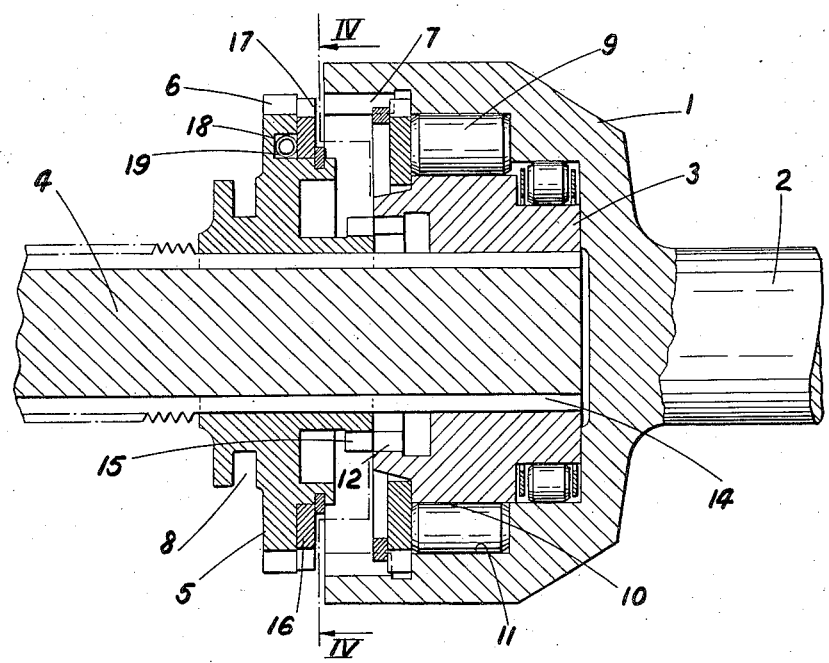
Fig. 3 is a view in axial section of a lockable free-wheel mechanism similar to that shown in Figs. 1 and 2, but provided also with an antijamming balking ring or mask.
Figure 4:
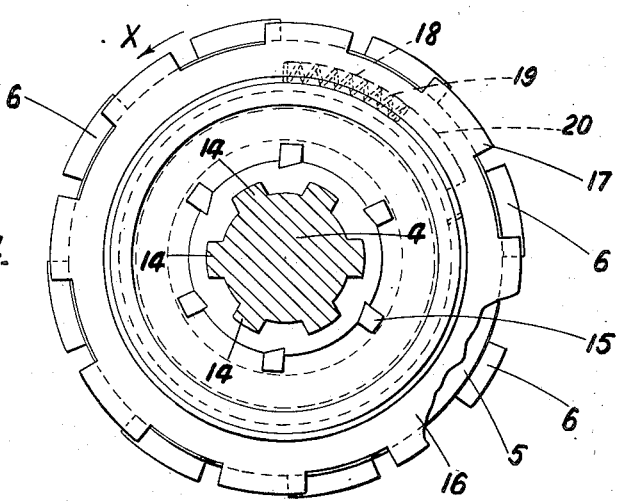
Fig. 4 is a transverse section taken on the line IV—IV of Fig. 3.

The mask may, for instance, be mounted with the requisite limited angular or rotary play, upon the free wheel locking plate 5. This arrangement is shown in Figs. 3 and 4, wherein 16 designates the mask ring having masking teeth 17 which correspond to the locking dog teeth 6. The member 5 has an arcuate recess 18, in which is housed a spring 19, acting on a lug 20 which projects from the balking ring 16 into the said recess. The action of this spring on said lug is to bias the balking ring 16 to a balking or masking position, in which its balking teeth 17 are displaced or disaligned relatively to the dogs 6 in a direction opposite to the normal or "forward" direction of rotation of the mechanism, such normal direction being indicated by the arrow X in Fig. 4.

Said arrangement is such that when the drive is being transmitted through the free wheel clutch and the synchronizing balking teeth 12, 15 cease to balk, the auxiliary balking teeth 17 can interengage with the dogs 7, if urged to do so by axially directed pressure on the locking plate. The dogs 6, however, are not, at this stage, in proper alignment for entering between the dogs 7, and such alignment can then only be established by slowing down the shaft 4 or speeding up the shaft 2. In either case the balking ring 16 will be carried around on the member 5 to the non-balking position, in opposition to the action of the spring 19, so as to permit entry of the dogs 6 between the dogs 7 and as, at the same time a free-wheeling action will have been initiated before engagement of the locking dogs, it is clear that mutual jamming between the dog clutch and the free-wheel clutch cannot take place. Since, for their engagement, the dogs 6 and 7 must have relative angular or rotary movement, as well as relative axial movement, toward each other, they may be said to move into engagement with each other along a substantially helical path of travel. If desired, their opposing end faces may be chamfered so as to assist the engagement in the desired manner.

Still another expedient for the prevention of jamming consists in forming one or both sets of locking dogs with end faces chamfered or inclined in a direction favoring engagement under free-wheeling conditions and interposing between adjacent dog teeth, in at least one set, a radially yielding preferably cam-like obturating member of which the outer end face or edge lies substantially in the plane of the outer end faces of the dogs themselves, this radially yielding member being so shaped or inclined that at that side of the intertooth gap where jamming could occur it penetrates deeply enough to balk entry of an opposing dog, while at the opposite side of said gap it does not enter or, at least, does not penetrate so far and can, therefore, be pushed out of the way by an opposing dog having the direction of motion associated with incipient free wheeling.

A preferred form of the said radially yielding obturating member is shown in Figs. 5, 6 and 7. This consists of a resilient split annulus or C-shaped member surrounding the set of dogs concerned and anchored thereto at one end, while the other end, preferably broadened, is shaped to a cam-form appropriate to the action already described. In this way an effective spring obturator is produced in a very light form which obviates possible difficulties due to unbalance or to the action of centrifugal force.

As illustrated (see Fig. 5), the free wheel outer member 1 has a covering 29 carrying the locking dogs 7 adapted to be engaged by the dogs 6 on the locking plate 5, subject to control by the synchronizing balking teeth 12 and 15. Opposing end faces of the locking dogs 6 and 7 are inclined or chamfered, as illustrated at 6ª and 7ª (see Fig. 7), the direction of inclination being such as to favor entry of the dogs of one set between the dogs of the other set during overrun; that is to say, under conditions in which the locking plate dogs 6 may be said to take a helical path of travel in entering into engagement with the free wheel dogs 7. On the other hand, axially directed entry of the locking plate dogs between the free wheel dogs is prevented by the obturating member 31 (Figs. 6 and 7) which occupies the gap between two adjacent dogs 7 and extends outwards to the plane of the outermost end faces of these dogs. Part 32 of the member 31 extends circumferentially in relation to the dogs 7 and is positioned to pass the dogs 6 but the inclined cam-like part 33, being within the intertooth gap, is the part which balks axial entry of the opposing dogs. However, a dog 6 having appropriate combined axial and rotary movement relatively to the dogs 7 can enter beneath part 32 and, acting on the inclined cam-like part 33 thereof, can drive the whole obturator radially outwards, thus permitting full engagement of the locking dogs. Member 31 is yieldingly held in the position shown, preferably by making it part of a resilient split annulus 34, embracing the dogs 7 and anchored to one of the same as represented at 35. The ring 34 itself, being narrower than the actual obturator member 31, may conveniently occupy a circumferential groove 36 in the ring of dogs 7, and in this way will be located axially. The groove 36 is, of course, made deep enough to retain the ring with certainty when the member 31 is pushed outwards by an entering dog.

Figs. 3 and 4 on the one hand and Figs. 5 and 6 on the other hand, show anti-jamming means applied to free wheel mechanisms embodying synchronizing balking means, as described herein with reference to Figs. 1 and 2. Thus, in the operation of these devices, the driving and driven members of the free wheel will, when locking is attempted, first be brought substantially to synchronism so that the synchronizing balking teeth 12 and 15 clear each other, after which incipient overrun of the free wheel must take place to free the anti-jamming mask or obturator. This arrangement is preferred because the anti-jamming device, when used alone cannot prevent but may tend rather to favour impactive engagement of the dogs during high speed overrun. However, any of the anti-jamming measures referred to herein are applicable to free wheels in which approximate synchronization of the driving and driven members is left to the care of the operator or driver. The synchronizing balking means, when employed in conjunction with an anti-jamming mask or obturator are preferably arranged so that, when balking, they hold one set of locking dogs just clear of the mask or obturator associated with the other set.

Figs. 8 and 9 show an arrangement permitting the free wheel to be locked even at times when the synchronizing balking teeth 12, 15 are mutually positioned to resist such locking.

The free wheel locking member is here shown as consisting of two concentric elements 5ᵃ and 5ᵇ, of which the inner one 5ᵇ, carrying the balking teeth 15, is slidably splined on the driving shaft 4 and the outer one 5ᵃ, carrying the locking dogs 6, is slidable on splines 21 upon the inner one. These two elements are normally locked together by yielding latching means, such as a spring pressed ball 23 in the member 5ᵃ, adapted to seat into the depression 24 in the member 5ᵇ. Thus, under normal operating conditions, the members 5ᵃ, 5ᵇ when urged axially, as by a shifting fork working in the groove 8 in the member 5ᵃ, move or are balked, as one unit. However, in response to abnormal axial pressure applied to the outer element 5ᵃ the ball 23 is forced out of the depression 24 against the action of the spring 22 and said outer element can then advance to locking engagement with the free wheel driven member 1 in spite of the normal balking action of the inner element. Upon disengaging the outer element 5ᵃ, or locking plate proper, after it has been so engaged, it becomes automatically latched again to the inner element 5ᵇ. When, as shown, an anti-jamming device is provided, this does not prevent locking for reversing purposes from taking place. For example, in the case of the balking ring 16, the masking teeth 17 first engage the dogs 7 and then the application of reverse drive to shaft 4 brings the dogs 6 into alignment (in opposition to the spring bias of the balking ring 16), whereupon the dogs 6 and 7 engage, under maintained axial pressure on the member 5ᵃ.

Unbalked locking can also be obtained by the arrangement shown in Fig. 10. Here, however, neither the synchronizing balking means nor the anti-jamming means (when provided) comes into action at all when the free wheel is being locked for reversing purposes. The outer shell or cup 1, constituting the free wheel driven member, is extended axially over and beyond the dogs 6 of the free wheel locking plate 5, and on the interior of its said extension there is provided an auxiliary set of dogs 25 with which the dogs 6 of said locking plate can be engaged directly, without introducing any balking action at all. This is done by sliding the locking plate 5 axially from its normal unlocked position (as shown in the drawing) in the direction opposite to that in which it is moved for normal locking, that is to say, in the direction indicated by arrow Y.

Where a transmission gear is applied, as for instance in an automobile, the axial sliding of the outer element of the free wheel locking device over the inner element (in the case of the first of the aforementioned embodiments), or the reversed axial sliding of the locking plate (in the case of the second-mentioned embodiment), may be under the control of the reverse selector or shift rod, or a part associated therewith in the change speed and reversing gear of the transmission system. The arrangement shown in Figs. 10, 11 and 12 affords still other means for overcoming the balking tendency of the synchronizing balking means when it is required to lock the free wheel in spite of the balking action.

Figure 11:
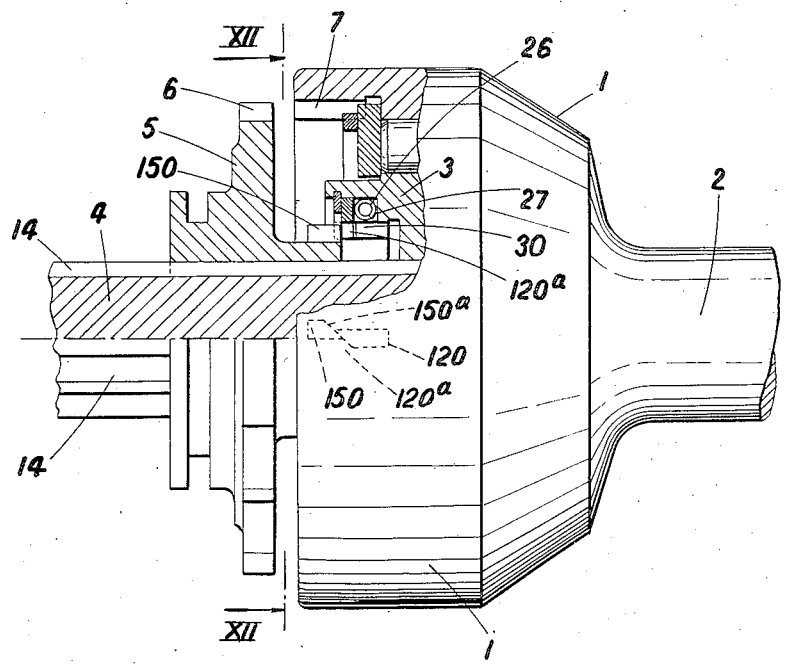
Fig. 11 is a view, partly in side elevation and partly in section, showing an arrangement whereby the balking action of the synchronizing balking means can be overcome when required.
Figure 12:
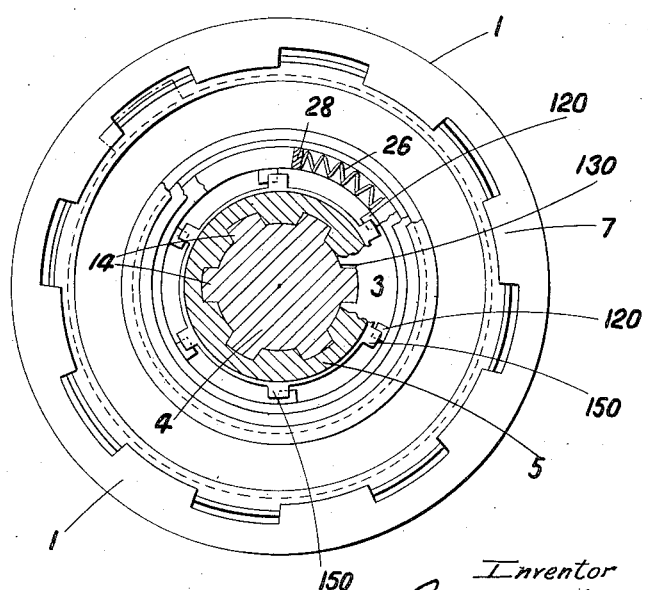
Fig. 12 is a transverse section taken substantially on the line XII—XII of Fig. 11.

In this instance, the synchronizing balking elements consist of teeth 150 formed on an extension of the locking plate member 5, and teeth 120 formed on a balking ring 30, which latter is mounted, for rotary play within a limited angle, on the internal member 3 of the free wheel clutch. This member 3 itself has limited play (indicated at 130 in Fig. 12) on the splines 14 of the shaft 4. A spring 26, housed in a recess 27 in the member 3, acts on a lug 28 projecting from the balking ring 30 into said recess and biases said balking ring to balking position; that is to say, advances it to a limited extent in the direction opposite to that of rotation relatively to the locking plate 5 and the balking teeth 150 carried thereby. However, the confronting end faces 120ᵃ and 150ᵃ of these balking teeth are inclined, as represented in Fig. 11, in such a direction that when the locking plate 5 is urged axially in the direction for locking the free wheel, the balking ring 30 can, if sufficient axial pressure is applied, be forced around forward, in opposition to its spring bias, out of the balking position, thus permitting engagement of the dogs 6 and 7. When a change speed and reversing gear is included in the transmission mechanism, movement of the reverse gear selector rod, or of a part associated therewith, may be utilized for supplying the necessary axial pressure to so displace the balking ring 30 and effect the locking of the free wheel.

Anti-jamming means may be added to the arrangement if desired.

What I claim is:—

1. In a lockable free-wheel transmission mechanism, including driving and driven free-wheel clutch members on separate shafts, a locking member movable on one of the shafts into engagement with the clutch member on the other shaft so as to positively connect the two shafts together and having means thereon working against the clutch member on the same shaft therewith to oppose such engagement during free-wheeling and to delay the same until overrun of one clutch member by the other has ceased; said means comprising teeth on the locking member engageable with teeth on said clutch member on the same shaft therewith before its engagement with the clutch member on the other shaft but normally held out of register with said teeth of the said clutch member by angular displacement of the latter on the shaft therewith.

2. In a lockable free-wheel transmission mechanism, including driving and driven free-wheel clutch members on separate shafts, one of said members having a limited angular play on its shaft, a third member constituting a locking plate movable axially on the shaft of one of the aforesaid clutch members into engagement with the clutch member on the other shaft so as to positively connect the two shafts together and having means thereon working against the clutch member on the same shaft therewith to oppose such engagement during free-wheeling and to delay the same until overrun of the driven clutch member relative to the driving clutch member has ceased; said means comprising a series of coaxial teeth on said locking plate member engagable with like teeth on said clutch member on the same shaft therewith before its engagement with the clutch member on the other shaft and normally held out of register with said teeth on the said clutch member by the angular displacement of the latter resulting from its play on the shaft therewith; the teeth of said locking plate member and the clutch member on the shaft therewith being brought into register so as to interengage when synchronization of the two clutch members causes the first named thereof to shift from its angular displacement.

3. In a lockable free-wheel transmission mechanism, an outer and an opposed inner free-wheel clutch member on separate alined driving and driven shafts, a locking member on the shaft with said inner clutch member and movable axially thereon toward said clutch member, together with means for so moving the same, means on the locking member for axially interengaging with the outer clutch member so as therethrough to positively couple the two shafts together, and means also on said locking member for first axially interengaging with said inner clutch member, the second named interengaging means being prevented from functioning during free-wheeling of the two clutch member parts and until one of said parts ceases overrunning the other, by angular displacement of said inner clutch member upon its shaft and means associated with the first named interengaging means for preventing a coupling of the two shafts therethrough until a free-wheeling action between the two clutch members has started.

4. In a lockable free-wheel transmission mechanism, an outer and an opposed inner clutch member on alined separate driving and driven shafts, the inner of said members having a limited angular displacement play on its shaft, a third member operable as a locking plate mounted on the shaft with said inner clutch member and movable axially thereon toward said clutch member, together with means for so moving the same, means on said locking plate member for engaging the outer clutch member so as to positively couple the two shafts together, and means also on said locking plate member for first engaging said inner clutch member, the second named engaging means comprising interfitting teeth on the locking plate and inner clutch members having opposed inclination edges in a vertical plane which are prevented from engaging fully by angular displacement of said inner clutch member upon its shaft during free-wheeling of the two clutch members and until the one member ceases to overrun the other, said teeth being brought into alinement by shift of said inner member from displaced position on its shaft.

5. In lockable free-wheel transmission mechanism, a free-wheel clutch comprising a driving and a driven member, together with a third member constituting a locking plate, one of said clutch members having locking dogs adapted to be engaged by relative axial movement of said third member and said third member having corresponding dogs adapted to engage therewith, and the other of said clutch members being adapted to connection with said third member by means permitting limited relative angular play between them, combined with means acting on said third member for urging the dogs thereof into engagement with said dogs of the first named clutch member, said third member and the second named clutch member connecting with angular play therebetween being provided with opposed balking teeth, which, by reason of the aforesaid angular play, abut endwise and balk engagement of the main locking dogs when the free-wheel is overrunning, but clear each other to permit engagement of the main dogs when overrunning ceases, the confronting end faces of the said opposed balking teeth being so inclined that, under the influence of the aforesaid yielding means acting on the third member, they yieldingly interlock in the balking position and are positively locked only in response to cessation of the free-wheel overrun.

6. In a lockable free-wheel transmission mechanism comprising an outer and an opposed inner free-wheel clutch member on alined separate driving and driven shafts, a third member constituting a locking plate mounted for movement axially on the shaft with said inner clutch member and said inner clutch member having a limited angular play on said shaft, means for moving said third locking plate member into locking position, means on said locking plate member, for axially interengaging with the outer clutch member so as to positively couple the two shafts together therethrough and means also on said locking plate member for first corespondingly interengaging with said inner clutch member, means including the second named engaging means and displacement of the inner clutch member on its shaft for balking the effectuation of the first named engaging means when the driven clutch member is rotating substantially faster than the driving member, and means co-actable with the locking plate member for rendering said balking means ineffective to permit locking of the clutch members for reverse purposes when the transmission is at rest.

7. In a lockable free-wheel transmission mechanism comprising an outer and an opposed inner free-wheel clutch member on alined separate driving and driven shafts, a third member constituting a locking plate mounted for movement axially on the shaft with said inner clutch member and said inner clutch member having a limited angular play on said shaft, means for moving said third locking plate member into locking position, means on said locking plate member, with associated anti-jamming or mask means, for axially interengaging with the outer clutch member so as to positively couple the two shafts together therethrough and means also on said locking plate member for first correspondingly interengaging with said inner clutch member, means including the second named engaging means and displacement of the inner clutch member on its shaft for balking the effectuation of the first named engaging means when the driven clutch member is rotating substantially faster than the driving member, and means co-actable with the locking plate member for rendering said balking means ineffective to permit locking of the clutch members for reverse purposes when the transmission is at rest.

8. In lockable free-wheel transmission mechanism, comprising a free-wheel clutch including a driving and a driven member and means operable to lock said driving and driven members positively together, the combination of means for balking the locking when the driven member of the clutch is rotating substantially faster than the driving member, and means for rendering such balking means ineffective when the transmission is at rest; one of said clutch members being furnished with locking dogs and the other thereof with balking teeth, a locking device having dogs engageable with the first mentioned locking dogs and balking teeth adapted normally to be balked by the first mentioned balking teeth only when free-wheeling is taking place, and locking control means, said locking device comprising two concentric elements with means for yieldingly latching them against relative axial movement and means for positively restraining them from relative rotary movement, one of said elements carrying the second mentioned locking dogs and the other carrying the second mentioned balking teeth, the said locking control means acting directly on the element carrying the second mentioned locking dogs, and said yielding latching means being adapted, in response to abnormal axial pressure on the locking device, to permit the element carrying the second mentioned locking dogs to advance axially to locking position while the element carrying the second mentioned balking teeth is still balked against corresponding axial advance.

9. In lockable free-wheel transmission mechanism, comprising a free-wheel clutch including a driving and a driven member and means operable to lock said driving and driven members positively together, the combination of means for balking the locking when the driven member of the clutch is rotating substantially faster than the driving member, and means for rendering such balking means ineffective when the transmission is at rest; the outer one of said clutch members being furnished with locking dogs and the inner one of said members being furnished with balking teeth, a locking plate having locking dogs engageable with the first mentioned locking dogs and balking teeth adapted to be balked by the first mentioned balking teeth only when free-wheeling is taking place, and locking control means acting on said locking plate, said outer member of the clutch extending over and beyond said locking plate and carrying auxiliary locking dogs, and said locking control means being movable in one direction to engage the locking plate dogs with the first mentioned locking dogs on the outer clutch member, subject to control by the balking teeth, and in opposite direction to engage the locking plate dogs with the said auxiliary locking dogs without any balking action taking place.

10. In lockable free-wheel transmission mechanism, comprising a free-wheel clutch including a driving and a driven member and means operable to lock said driving and driven members positively together, the combination of means for balking the locking when the driven member of the clutch is rotating substantially faster than the driving member, and means for rendering such balking means ineffective when the transmission is at rest; a locking plate adapted for locking engagement with one of said members by relative axial movement between them, and locking control means operable to urge the parts to the locked condition, said locking plate being coupled for relative axial movement and for limited relative angular movement to the free-wheel member other than that which it engages for locking, and said locking plate being further provided with balking teeth adapted to coact with a balking ring mounted with limited angular play upon the last mentioned of the free-wheel members and biased normally to balking position by means adapted to yield and so to permit the normal balking action to be overcome in response to abnormal axial pressure exerted on the locking parts by the locking control means.

11. In lockable free wheel transmission mechanism, a free wheel clutch comprising driving and driven members opposed one within the other on alined separate shafts, a positive dog clutch including a third member movable axially on the shaft of one of said members and operable to lock the two members together by engagement first with one and then the other jointly, means for operating said positive dog clutch, and means operative automatically upon engagement of the positive dog clutch to prevent mutual jamming as between the said positive dog clutch and the said free wheel clutch.

12. In lockable free wheel transmission mechanism, a free wheel clutch comprising driving and driven members, one of which is furnished with locking dogs while the other is slidably associated with a locking device including opposing locking dogs adapted to be slidably engaged with said first-mentioned locking dogs, means for controlling the engagement and disengagement of said two sets of dogs, and means adapted to balk simple axially directed relative engaging movement of the dogs but to permit interpenetration thereof by relative helical movement in the overrunning condition of the free wheel clutch, the last named means including a mask mounted with limited angular play upon one of the two members carrying the locking dogs and means for yieldingly biassing said mask to a position in which, when the free wheel is transmitting the drive, said mask can engage the dogs on the opposing dog carrying member while masking the dogs on the member on which it is mounted, said biasing means being organized to permit angular displacement of the mask by the opposing dogs and interengagement of the two sets of dogs immediately upon the inception of overrun.

13. In lockable free wheel transmission mechanism, a free wheel clutch comprising driving and driven members, one of which is furnished with locking dogs while the other is slidably associated with a locking device including opposing locking dogs adapted to be slidably engaged with said first-mentioned locking dogs, means for controlling the engagement and disengagement of said two sets of dogs, and means adapted to balk simple axially directed relative engaging movement of the dogs but to permit interpenetration thereof by relative helical movement in the overrunning condition of the free wheel clutch, the locking dogs of at least one of the sets thereof on the two locking-dog-carrying members having the end faces thereof inclined in a direction favoring engagement with the locking dogs of the opposing set in the overrunning condition of the free wheel clutch, and a radially yieldable member located in an intertooth gap between adjacent locking dogs, said radially yieldable member being organized to balk entry of an opposing dog except when such opposing dog approaches from a direction associated with incipient overrun of the free wheel clutch and being displaceable by such a dog, approaching from such direction.

14. In lockable free wheel transmission mechanism, a free wheel clutch comprising a driving and a driven member opposed one within the other on separate alined shafts, means including a third member movable axially on the shaft with one of said members operable to lock the two members together by engagement first with one and then with the other jointly, means for urging said third member of the locking means to locking condition, means including balking teeth on said third member and the clutch member on the same shaft therewith operative automatically during free wheel overrun to delay the locking until after the driving and driven members of the free wheel clutch have attained substantial synchronism, and means automatically operative when such substantial synchronism exists to delay the locking still further to the point of first inception of overrun.

15. In lockable free wheel transmission mechanism, a free wheel clutch comprising a driving and a driven member, means operable to lock said driving and driven members together, means for urging said locking means to locking condition, means operative automatically during free wheel overrun to delay locking until after the driving and driven members of the free wheel clutch have attained substantial synchronism, means automatically operative when such substantial synchronism exists to delay locking still further to the point of first inception of overrun and means operable to render ineffective both of said delaying means.

REGINALD WARREN.